UNITED STATES PATENT OFFICE 2,404,103

ISOMERIZATION OF CIS-ALPHA-BETA UNSATURATED ACID ESTERS

Winfield Scott, deceased, late of Akron, Ohio, by Ruth P. Scott, executrix, Akron, Ohio, assignor to Wingfoot Corporation, Akron, Ohio, a corporation of Delaware No Drawing. Application August 9, 1943, Serial No. 497,971

4 Claims. (Cl. 260—485)

This invention relates to the isomerization of alpha-beta unsaturated acids and esters from the cis to the trans form. The invention lies in the use of a conversion agent, without which, under comparable conditions, no detectable conversion occurs. The invention includes the isomerization of such compounds in which one or more of the hydrogens connected directly to a carbon atom have been replaced by chlorine, an alkyl group or other substituent. The ester may be an alkyl ester, such as methyl, ethyl, propyl, etc., or an aralkyl ester, such as benzyl, etc. It includes the isomerization of angelic-acid esters to tiglic-acid esters; cinnamic esters from the cis to the trans isomer; chlormaleic-acid esters to chlorfumaric-acid esters; citraconic-acid esters to mesaconic esters; crotonic-acid esters from the cis to the trans isomer; etc.

According to this invention, the isomerization is effected in the presence of an isomerizing agent which contains the grouping $$(C_3) Z-C-S$$
$$\phantom{(C_3) Z-}\overset{|}{X}$$

in which X may be hydrogen, carbon or sulfur, and Z may be oxygen or carbon. Representative examples of such isomerizing agents which include the alkyl mercaptans, the aryl disulfides, the salts of the dithio acids, etc., are:

Cresyl disulfide (1) 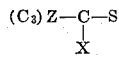

Cyclohexylamine derivative of zinc dithiofuroate (2) 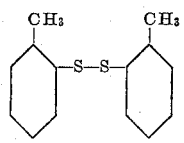

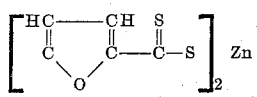

Dodecyl mercaptan (3) $C_{12}H_{25}SH$

Ammonium dithiofuroate (4) 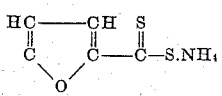

Disodium 2-hydroxy-dithionaphthoate (5) 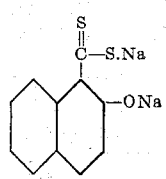

Di-isopropyl xanthogen disulfide (6) $(CH_3)_2.CH.O.C(:S).S_2.C(:S).O.CH.(CH_3)_2$ The invention will be illustrated by the following examples

Example 1

Five grams of diethyl maleate were heated with 0.05 gram of the cyclohexylamine derivative of zinc dithiofuroate at 160° C. After 30 minutes, measurement of the consolute temperature of a mixture of 0.4 ml. of the reaction mixture and 0.6 ml. of Nujol (mineral oil) showed that 16 per cent of the maleate ester had been converted to the fumarate.

Example 2

A mixture of 1 part of di-isopropyl xanthogen disulfide and 100 parts of diethyl maleate was heated at 200° C. Every 20 minutes a 0.4 ml. sample was withdrawn and mixed with 0.6 ml. Nujol. The consolute temperature of this mixture was determined, and from it, the percentage of diethyl fumarate in the reaction mixture was calculated. The results are given below:

| Time | Consolute temp., °C. | Per cent diethyl fumarate |
|---|---|---|
| Just after mixing | 102.25 | |
| After heating to 200° | 95.25 | 8.5 |
| After 20 minutes at 200° | 62.50 | 47.5 |
| After 40 minutes at 200° | 44.75 | 68.5 |
| After 60 minutes at 200° | 35.75 | 80.0 |

At 160° C. the yield after 1 hour was only 13 per cent.

Example 3

A mixture of 5 grams of diethyl maleate and 0.05 gram of cresyl disulfide was heated at 160° C. for about 1 hour. Approximately 24 per cent of the ester was converted to the fumarate.

Example 4

One part of dodecyl mercaptan was dissolved in 100 parts of diethyl maleate. The resulting solution was heated for 1 hour at 160° C., giving an 8 per cent conversion to the fumarate. When the temperature was raised to 200° C., however, the yield was increased to 41 per cent.

Example 5

When 5 grams of diethyl maleate were heated with 1 per cent ammonium dithiofuroate for 1 hour at 160° C., 27 percent conversion to the fumarate ester was secured.

Example 6

A mixture of 5 grams of diethyl maleate and 0.05 gram of disodium 2-hydroxy-dithionaphthoate was heated for 1 hour at 160° C. Determination of the consolute temperature of the reaction mixture revealed that 6 per cent of the ester had been converted to the fumarate.

Other conversion agents that may be used include: phenyl disulfide, dimethyl phenyl disulfide, octyl mercaptan, octadecyl mercaptan, amyl disulfide, hexyl disulfide, dodecycl disulfide, zinc dithiofuroate, sodium dithiofuroate, xanthic disulfide, zinc dithionaphthoate, zinc dithioacetate, zinc dithiobutyrate, dithiobenzoic acid, benzyl mercaptan, benzyl disulfide, etc.

In determining the percentage of the trans form of an alpha beta unsaturated ester prepared in accordance with the process of this invention, a mixture of Nujol (a special type of mineral oil) and a sample of the reaction mixture resulting from the heating of the alpha beta unsaturated acid or ester with any of the suitable isomerizing agents of this invention, is heated to about 120° C. (or some temperature higher than the consolute temperature of the mixture) and then the heated mixture is allowed to cool and the temperature at which the mixture just begins to become clouded is observed and is referred to as the consolute temperature. This temperature is referred to a chart (on which is plotted a series of consolute temperatures and corresponding conversion percentages obtained from known mixtures of an alpha beta unsaturated compound) and the corresponding percentage conversion obtained.

What is claimed is:

1. The process of isomerizing a cis alpha, beta-unsaturated dicarboxylic diester to the trans isomer which comprises the step of heating the ester in the presence of dodecyl mercaptan.

2. The process of isomerizing a cis alpha, beta-unsaturated dicarboxylic diester to the trans isomer which comprises the step of heating the ester in the presence of cresyl disulfide.

3. The process of isomerizing di-ethyl maleate to the trans isomer which comprises the step of heating the maleate in the presence of the cyclohexylamine derivative of zinc dithiofuroate at a temperature of about 160° C. until conversion is substantially complete.

4. The process of isomerizing a cis alpha, beta-unsaturated dicarboxylic acid diester to the transisomer, which comprises the step of heating the diester in the presence of an isomerizing agent containing at least 5 carbon atoms selected from the group consisting of alkyl mercaptans, aryl disulfides and salts of the dithio acids.

RUTH P. SCOTT.
*Executrix of the Last Will and Testament of Winfield Scott, Deceased*